United States Patent [19]

Kral et al.

[11] Patent Number: 4,642,501
[45] Date of Patent: Feb. 10, 1987

[54] MAGNETIC SUSPENSION AND POINTING SYSTEM WITH FLUX FEEDBACK LINEARIZATION

[75] Inventors: Kevin D. Kral, Phoenix; Douglas D. Havenhill, Peoria, both of Ariz.

[73] Assignee: Sperry Corporation, New York, N.Y.

[21] Appl. No.: 786,979

[22] Filed: Oct. 15, 1985

[51] Int. Cl.⁴ ............................................. F16C 39/00
[52] U.S. Cl. ................................................ 310/90.5
[58] Field of Search ........................ 310/90.5; 318/138

[56] References Cited

U.S. PATENT DOCUMENTS

| | | | |
|---|---|---|---|
| 4,080,553 | 3/1978 | Lyman | 318/138 |
| 4,088,379 | 5/1978 | Perper | 308/10 |
| 4,167,296 | 9/1979 | Dendy | 308/10 |
| 4,313,077 | 1/1982 | Haeussermann | 318/254 |
| 4,392,693 | 7/1983 | Habermann et al. | 308/10 |

Primary Examiner—Peter S. Wong
Assistant Examiner—D. L. Rebsch
Attorney, Agent, or Firm—Howard P. Terry; Arnold L. Albin

[57] ABSTRACT

A magnetic actuator for providing a single-axis, non-contacting force capability with unconstrained cross-axis mobility utilizes flux feedback force linearization. Electromagnets cooperating with an armature suspended therebetween are energized by a bias flux and a signal derived from flux densities sensed in the air gaps. The bias flux density may be optimized to minimize the peak power required by the actuator. The flux density signals are applied in a closed force loop to provide a net force directly proportional to the commanded flux.

9 Claims, 7 Drawing Figures

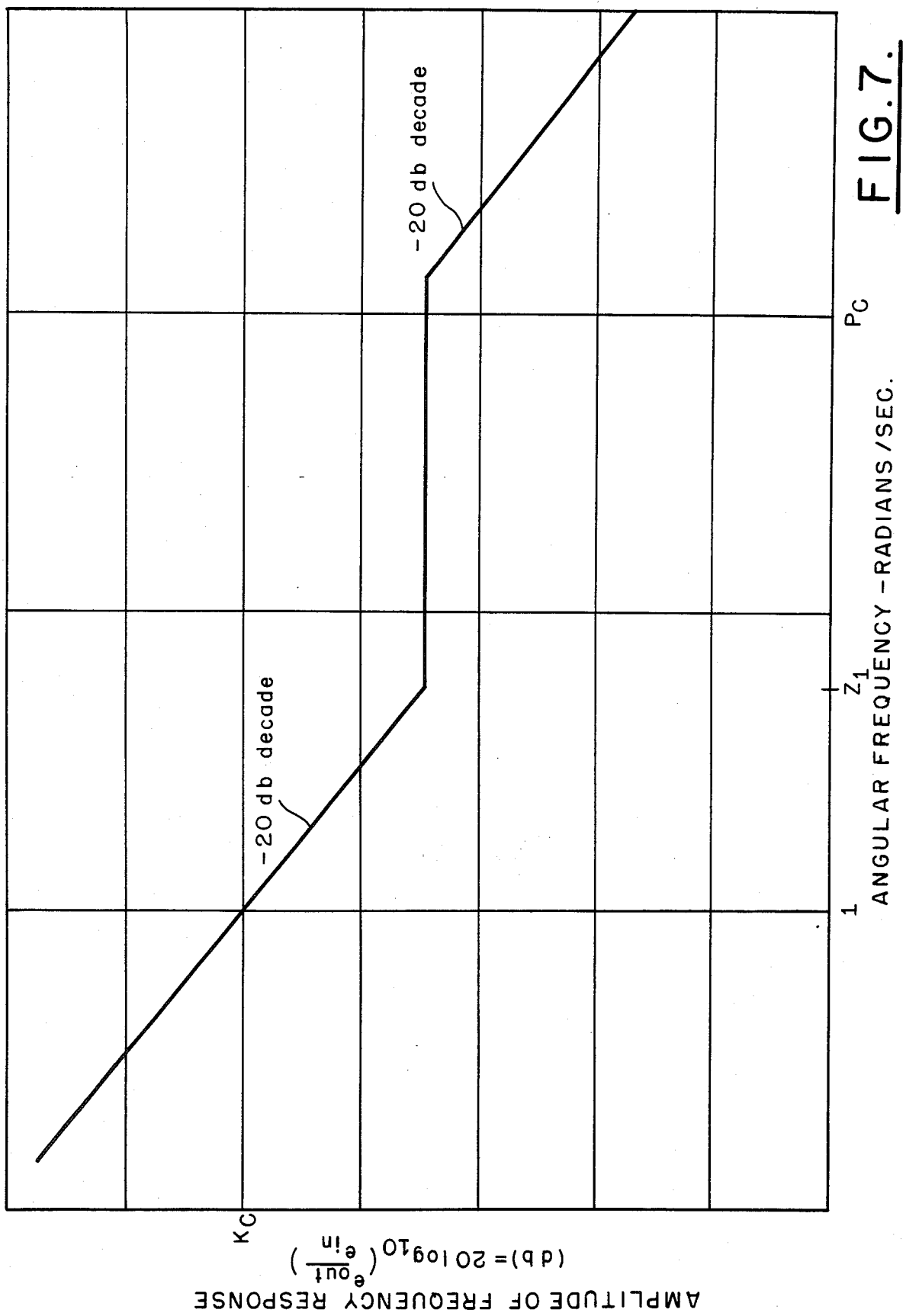

MAGNETIC SUSPENSION AND POINTING SYSTEM WITH FLUX FEEDBACK LINEARIZATION

BACKGROUND OF THE INVENTION

1. Field of the Invention

The invention relates generally to magnetic suspensions or levitations for moveable members. More specifically, the invention pertains to suspensions with unconstrained mobility in linear translation and a novel circuit using flux feedback for linearizing the net output armature force of a magnetic actuator adaptable to pointing and isolating instruments.

2. Description of the Prior Art

A differential magnetic actuator provides a single-axis, non-contacting force capability which is insensitive to cross-axis translations (i.e., those axes perpendicular to the direction of the force field). It includes at least two diametrically opposing electromagnets or half-stations acting on a moveable armature disposed therebetween. Force is exerted on the armature when a closed magnetic field is established around each half-station core and the moveable armature due to input coil current excitation. Force exerted by each half-station is unidirectional and acts only in a direction to decrease the gap between itself and the armature. By using two half-stations in a diametrically opposing configuration, the net armature force is equal to the algebraic sum of the force components contributed by each half-station.

The magnetic actuator exerts force on the armature along the axis perpendicular to the pole face. Armature motion along this axis is limited by the gap distance between each half-station. Translation along this axis would eventually result in contact between the armature and the actuator.

However, in the cross-axes (i.e. those axes perpendicular to the axis of force) armature or translation is not physically limited by the magnetic actuator. The only requirement is that the armature maintain a magnetic path between the half-station pole faces.

It is known to those skilled in the art that the net armature force of a differential magnetic actuator is inherently non-linear, being related to the squared functions of magnetizing currents and gaps for the coenergy relationship and to a squared function of gap flux densities for the energy relationship. Because of these inherent squared non-linearities, a significant problem arises in linearizing the net output armature force of the differential magnetic actuator in response to an applied force command; i.e., to obtain an armature force proportional to the input signal.

In providing linear force control on the armature of a differential magnetic actuator, previous control techniques have included Force Feedback and Current/Gap Feedback. See, for example, copending U.S. application Ser. No. 747,627, Position Sensor for Magnetic Suspension and Pointing System, invented by Brian J. Hamilton and assigned to the assignee of the present invention.

Force Feedback incorporates a force sensor in a closed-loop configuration to linearize the net forces on the armature. The armature is physically tied to the payload through the force sensor. Any force exerted on the armature is transmitted through the force sensor to the payload. The sensor itself is typically a quartz crystal which varies an oscillator frequency in response to a tensile or compressive force. Force on the armature is controlled by modulating the magnetic flux density produced by each half-station.

In this approach the force sensor, located between the suspended payload and armature, transmits a force signal across the magnetic gap, which through appropriate compensation, drives the flux producing coil current in each half-station. One drawback to this approach is that a harness assembly or complex non-contacting telemetry system must be employed across the magnetic gap. The use of a harness assembly is undesireable since it can degrade actuator performance by acting as a shunt spring.

Other drawbacks to this approach are that force sensors capable of a high bandwidth and resolution required for low level force control are costly, fragile, and require sophisticated support electronics. Further, because of their fragility, these sensors often require elaborate holding fixtures to protect them from damage during non-operational conditions.

As another approach, Current/Gap Feedback force linearization has been used. This technique is more common and utilizes the relationship between magnetizing current and air gap for a linear medium in an open force loop configuration. In this method force is controlled through the coenergy relationship that armature force is proportional to the square of the magnetizing current and inversely proportional to the square of the gap distance.

Any sensor capable of providing a signal proportional to gap position can be used. Previous applications have incorporated eddy current, capacitive, and inductive sensors.

By employing both current and gap position sensors, the requirement for and disadvantages of a force sensor are eliminated. To remove the current squared non-linearity, a bias current technique has been utilized. This consists of adding a flux producing bias current to one half-station and subtracting the same flux producing bias current from the diametrically opposite half-station.

However, because of the open force loop configuration and square law relationships, both the position and current sensing signals, as well as squaring compensation circuitry, must be very accurate and linear over full operational conditions. Because of the squaring relationship, percentage force errors can be greater than twice the percentage position and gap errors that cause them.

To implement the necessary gap feedback, position sensors are employed as described above. These sensors, because of their high accuracy requirements, are expensive and often require sophisticated compensation circuitry to achieve the necessary linearity over full operating conditions.

Additionally, because the applied armature force is related to the magnetic field established in the gap due the input coil currents, a linear relationship between the input coil current and magnetic flux is required. Therefore non-linearities due to hysteresis and saturation between the magnetic flux and input coil current can seriously impact actuator performance.

To attain the required linearity between the magnetic field and input coil current, core materials with low hysteresis properties are used. These materials however often require specialized processing and are difficult to machine, which raises the actuator cost. Also, these low hysteresis materials tend to saturate at relatively low flux densities. As a result a larger volume of core material is required to avoid saturation nonlinearities, increasing the actuator weight.

Finally, the Current/Gap Feedback force linearization requires multiplication circuitry which is often undesireable because of errors introduced due to temperature variations.

The present invention avoids the limitations of the prior art by utilizing the energy relationship between force and magnetic flux density in the gaps between the half-stations and armature to linearize the net force. Flux density is measured by a Hall Effect device.

SUMMARY OF THE INVENTION

The invention comprises apparatus for applying a force linearly proportional to an input command signal to the armature of a differential magnetic actuator. While the displacement of the armature is limited along an axis perpendicular to the plane of the armature, the armature is free for translation normal to the axial force. A force command signal representative of a desired armature force is applied to derive a flux command signal for providing control currents to electromagnetic coils of the magnetic actuator. A flux sensor is coupled to the core of each half-station for providing control signals corresponding to the actual flux density. The flux control signals and the flux command signals are applied to provide modified control currents in the half-station coils, thereby to provide a magnetic flux density which is linearly proportional to the force command signal.

In a preferred embodiment, the apparatus includes compensation circuitry for gain scaling the force command signals, means for applying a predetermined bias flux, and gain correction means for augmenting the frequency bandwidth of the compensation amplifier.

BRIEF DESCRIPTION OF THE DRAWINGS

FIG. 7 is a gain characteristic curve of a compensating amplifier as shown in FIG. 5.

DESCRIPTION OF THE PREFERRED EMBODIMENT

In the present invention, armature force is controlled by implementing a closed flux loop around each half station. These flux loops ensure that the magnetic flux density in the gaps is linearly proportional to a commanded input. To linearize the flux-squared term a bias technique is used. This consists of maintaining a constant bias flux in each half-station gap. The net force on the armature due to this bias flux is zero, since both sides are equal in magnitude and diametrically opposing. Force on the armature is controlled by adding a flux command of a predetermined magnitude to one half-station and subtracting the same flux command magnitude from the diametrically opposite half station. The result is that the net armature force is proportional to the product of the bias flux and commanded flux as shown below:

Let:

$$B_1 = B_{BIAS} + B_{CMD} \tag{1}$$

$$B_2 = B_{BIAS} - B_{CMD} \tag{2}$$

where $B_{BIAS}$ = The applied bias flux and
$B_{CMD}$ = The commanded flux.

For a linear medium, force is proportional to the square of the magnetic flux densities in the gaps between the half-stations and armature, as given in equation (3):

$$F_{NET} = \frac{A}{\mu_o} (B_1^2 - B_2^2) \tag{3}$$

where $F_{NET}$ = Net force exerted on armature (Newtons)
A = Cross-sectional area of magnetic actuator pole face (square meters)
$\mu_o$ = Permeability of free space ($4\pi 10^{-7}$ Henries/meter)
$B_1, B_2$ = Magnetic flux density at each half-station pole face (Tesla)

Then $$F_{NET} = \frac{4A}{\mu_o} B_{BIAS} B_{CMD} \tag{4}$$

Since the bias flux is held constant, the net force is directly proportional to the commanded flux. Therefore, the force produced by the differential electromagnet can be measured and controlled in a closed flux feedback loop by sensing the magnetic flux density produced by each half-station.

Figure 1:
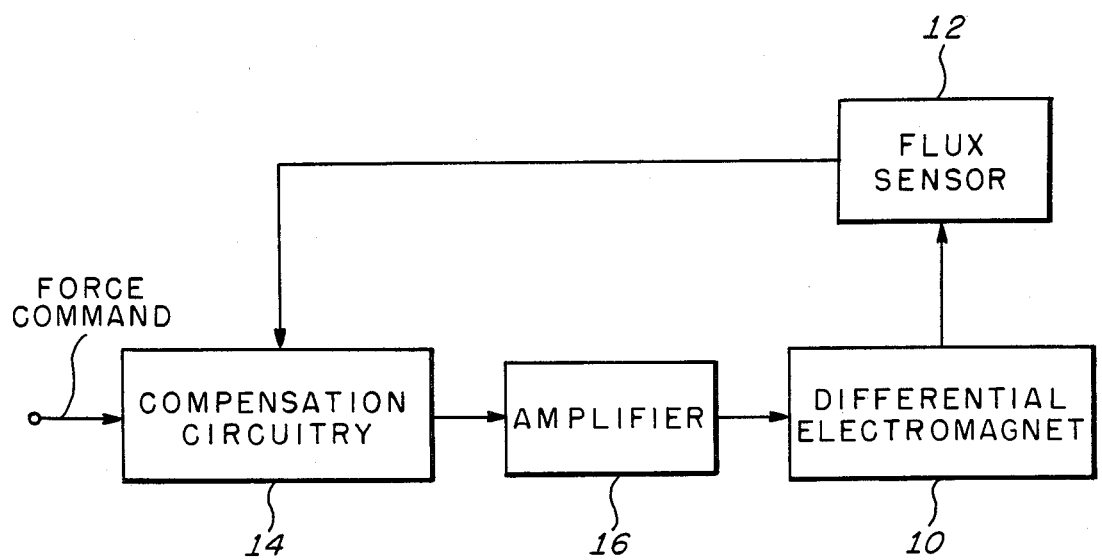
FIG. 1 is a conceptual block diagram showing a flux feedback linearization loop of the present invention.

Referring first to FIG. 1, a conceptual block diagram is shown of one feedback loop for driving a half-station. It will be appreciated that two such loops will be required for energizing two half-stations comprising a magnetic actuator. The magnetic actuator is comprising four major components: a differential electromagnet 10, a flux sensor 12, the compensation electronics 14, and an amplifier 16, all of which are described in further detail below with respect to FIG. 4.

Figure 2:
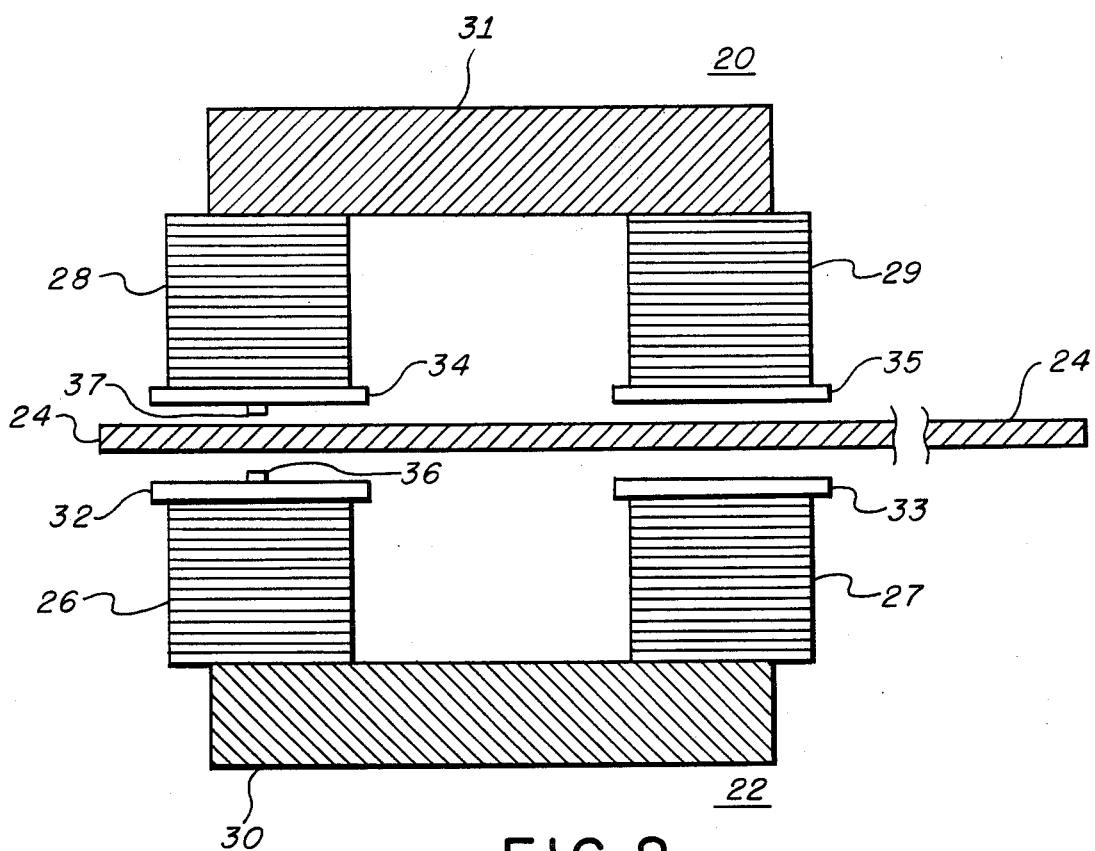
FIG. 2 is a schematic diagram in cross section of an electromagnetic actuator suitable for use in the present invention.

Referring next to FIG. 2, the differential magnetic actuator is comprising an electromagnet having two identical stator pieces 20, 22 and a soft iron armature 24. The stator pieces are each made up of two identical coils 26, 27 and 28, 29 connected in series and wound around a magnetic core 30, 31. The armature 24 is an essentially planar piece of soft iron or other magnetic material placed between the pole faces 32–35. The flux density is preferably sensed by a Hall Effect Device 36, 37 placed on one pole face of each stator.

Figure 3:
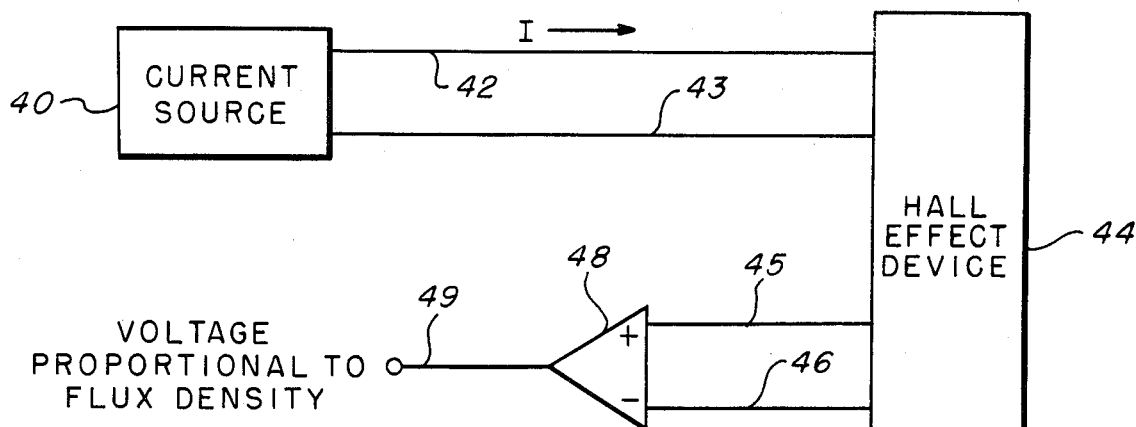
FIG. 3 is an electrical schematic diagram in block form of circuitry for utilizing a Hall Effect Device as a flux density sensor.

A block diagram of the electronics required to drive the Hall Effect Device and obtain an output is shown in FIG. 3. A current source 40 establishes a constant current in two leads 42, 43 of the Hall Effect Device 44. The voltage across the output terminals 45, 46 of the device is proportional to the magnetic flux density. This voltage is amplified by a high gain differential amplifier 48 to produce a suitable signal 49 proportional to the flux density for processing by the control circuitry.

Figure 4:
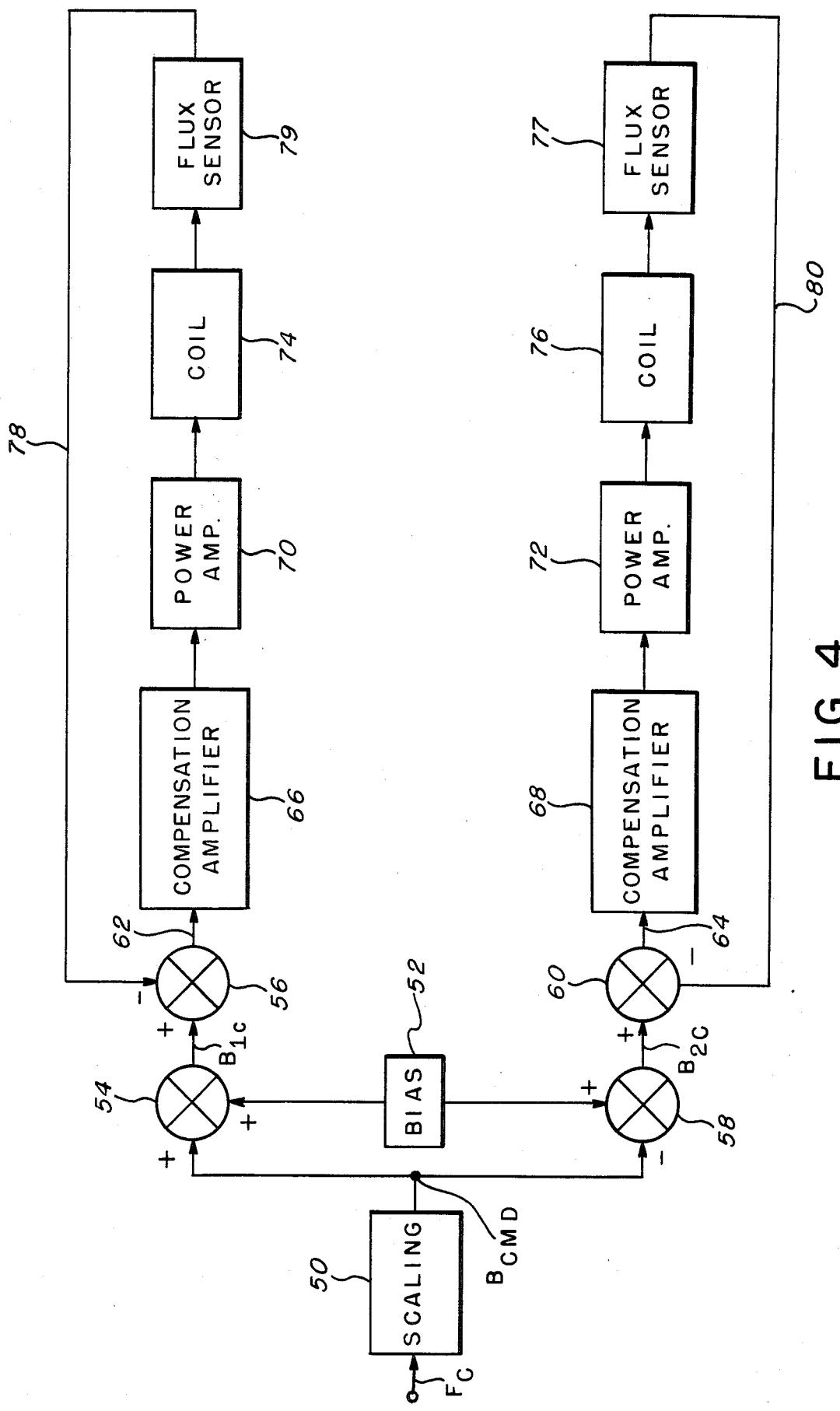
FIG. 4 is a block diagram showing the biasing and compensation circuitry of the present invention.

FIG. 4 shows the system of FIG. 1 with details of scaling, bias, and frequency compensating networks for driving the electromagnets of an opposing pair of half-stations.

The function of this circuitry is to accept a voltage proportional to the desired force output $F_C$, convert this voltage into two voltages $B_{1C}$, $B_{2C}$ proportional to the flux density levels required to produce this force, compare the required flux density levels with the measured flux density levels at sensors 77, 79 to provide resultant outputs 62, 64, and through the compensation amplifiers 66, 68 command the drive amplifiers 70, 72 to apply current to the coils 74, 76 to produce the required flux density. The force command $F_C$ is converted to flux density commands by gain scaling block 50 and adding bias flux density commands 52. The function of the bias command is to force the actuator to respond linearly to the force command.

In operation, the unidirectional force exerted by each half station on the armature is given by:

$$F_1 = \frac{A}{\mu_o} B_1^2 \quad (5)$$

$$F_2 = \frac{A}{\mu_o} B_2^2 \quad (6)$$

where
$F_1$, $F_2$ = the forces exerted by each half station (Newtons)
A = the actuator pole face area (square meters)
$\mu_o$ = the permeability of free space ($4\pi 10^{-7}$ Henries/meter)
$B_1$, $B_2$ = the flux densities at the half-station pole faces (Tesla)

Since each half-station is diametrically opposing with respect to the armature, the net armature force is the difference of the forces exerted by each half-station and can be described by $$F_C = F_{NET} = F_1 - F_2 \quad (7)$$

or $$F_C = F_{NET} = \frac{A}{\mu_o} [B_1^2 - B_2^2] \quad (8)$$

The closed flux loops 78, 80 around each half-station of the magnetic actuator ensure a flux density level in the magnetic gaps equal to a referenced input $B_{1C}$, $B_{2C}$. This input is obtained by applying the sum and difference of a flux density bias 52 and scaled command input $B_{CMD}$ to summing junctions 54 and 58, respectively:

$$B_{1C} = B_{BIAS} + B_{CMD} \quad (9)$$

$$B_{2C} = B_{BIAS} - B_{CMD} \quad (10)$$

Substituting these relationships into force equation (8) and simplifying yields $$F_C = F_{NET} = \frac{4A \, B_{BIAS} B_{CMD}}{\mu_o} \quad (11)$$

By holding $B_{BIAS}$ at a predetermined value the scaling factor 50 between the force command ($F_C$) and the flux density command ($B_{CMD}$) is:

$$\frac{B_{CMD}}{F_{CMD}} = \frac{\mu_o}{4AB_{BIAS}} \left(\frac{Tesla}{Newton}\right) \quad (12)$$

Thus, the bias flux density added to the scaled force command produces flux density commands which energize the compensation and power amplifiers to produce a force equal to the commanded force.

The bias flux density may be selected to minimize the peak power required by the actuator. Peak power occurs when the maximum force is commanded, therefore:

$$B_{MAX} = B_{BIAS} + \frac{N\mu_o}{4B_{BIAS}} F_{MAX} \quad (13)$$

which, assuming a linear actuator, is also given by $$B_{MAX} = \frac{N I_{MAX} \mu_o}{2g} \quad (14)$$

where,
g = the magnetic gap (meters)
N = Number of turns in coil winding
Thus, the peak power is $$P_{MAX} = I^2_{MAX} R = \frac{4g^2}{N^2 \mu_o^2} \left[ B_{BIAS} + \frac{N\mu_o}{4B_{BIAS}} F_{MAX} \right]^2 R \quad (15)$$

Taking the derivative of $P_{MAX}$ gives $$\frac{dP_{MAX}}{dB_{BIAS}} = \frac{8g^2}{N^2 \mu_o^2} \left[ B_{BIAS} + \frac{N\mu_o F_{MAX}}{4B_{BIAS}} \right] \left[ 1 - \frac{N\mu_o}{4B_{BIAS}^2} F_{MAX} \right] \quad (16)$$

Setting the derivative equal to zero yields $$B_{BIAS} = \frac{(N\mu_o F_{MAX})^{\frac{1}{2}}}{2} \quad (17)$$

Therefore, the above value of $B_{BIAS}$ will minimize the peak actuator power.

Figure 5:
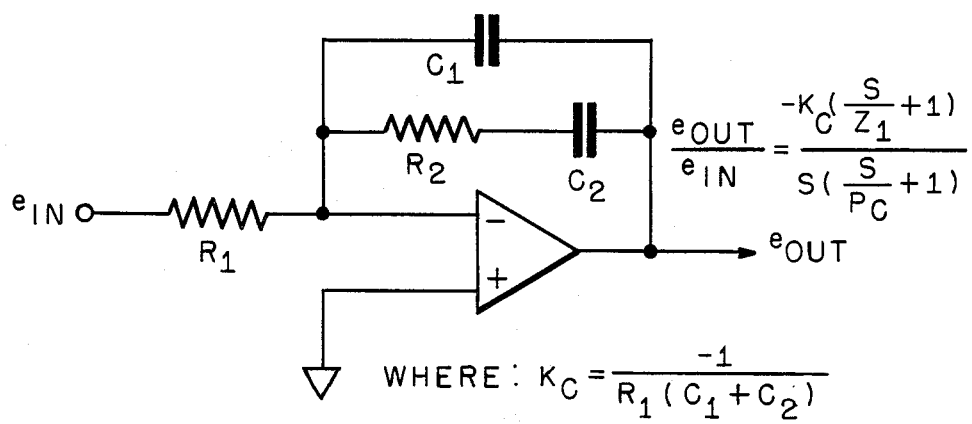
FIG. 5 is an electrical schematic diagram of a compensating amplifier.

Referring now to FIG. 5, the compensation amplifier $U_1$ comprises an integrator and a lead-lag network $C_1 R_2 C_2$. The integrator is used to reduce the dc force error and the lead-lag network is used to obtain increased bandwidth. The lead frequency is selected to cancel the low-frequency pole produced by the resistance and inductance of the electromagnet and the lag frequency is selected to assure control loop stability.

The compensation network parameters chosen for the flux loops around each half station are dependent on the desired frequency response. Typically the closed loop response chosen is of the form:

$$G_{CL}(S) = \frac{1}{\frac{S^2}{\omega_o^2} + \frac{2\delta S}{\omega_o} + 1} \quad (18)$$

where
  $\omega_0$ = the open loop crossover frequency
  $\delta$ = the damping coefficient
  $S$ = the Laplace operator To design compensation circuitry for the desired closed loop response the frequency characteristics of the magnetic actuator must be known. These characteristics are dependent upon the geometry of the actuator and are in the form shown below for each half-station:

$$\frac{B_{OUT}}{V_{COIL}} = \frac{K_P}{(S/P_1 + 1)(S/P_2 + 1)} \quad (19)$$

where
  $B_{OUT}$ = the flux density at the pole face for a given input coil voltage
  $V_{COIL}$ = voltage applied across coil windings
  $K_P$ = is a gain constant with units of (Tesla/Volt)
  $P_1$, $P_2$ = are poles associated with the transfer function For most actuator designs $P_2$ occurs at sufficiently high frequencies (typically >2 KHz) that it can be neglected; whereas $P_1$ occurs at low frequencies (typically <10 Hz) and must be compensated for. Thus each half station is conveniently viewed as having a frequency characteristic in form $$\frac{B_{OUT}}{V_{COIL}} = \frac{K_P}{(S/P_1 + 1)} \quad (20)$$

To obtain the closed loop response identified in equation (18), the compensation design would be in the form:

$$\frac{E_{OUT}}{E_{IN}} = \frac{K_C(S/Z_1 + 1)}{S(S/P_C + 1)} \quad (21)$$

where the zero ($Z_1$) is chosen to cancel the low frequency pole ($P_1$) of the actuator and compensation gain ($K_C$) and compensation pole ($P_C$) are chosen for the desired open loop crossover bandwidth ($\omega_0$) and damping coefficient ($\delta$). A typical compensation amplifier frequency characteristic curve is shown in FIG. 7.

From (18) for unity gain of the power amplifier and flux sensing blocks, the closed loop characteristics would be:

$$G_{CL}(S) = \frac{1}{\left[\frac{S^2}{K_C K_P P_C} + \frac{S}{K_P K_C} + 1\right]} \quad (22)$$

where $$K_C K_P P_C = \omega_0^2 \quad (23)$$

and $$\frac{1}{K_P K_C} = \frac{2\delta}{\omega_o} \quad (24)$$

One possible operational amplifier realization of this compensation design is shown in FIG. 5.

Figure 6:
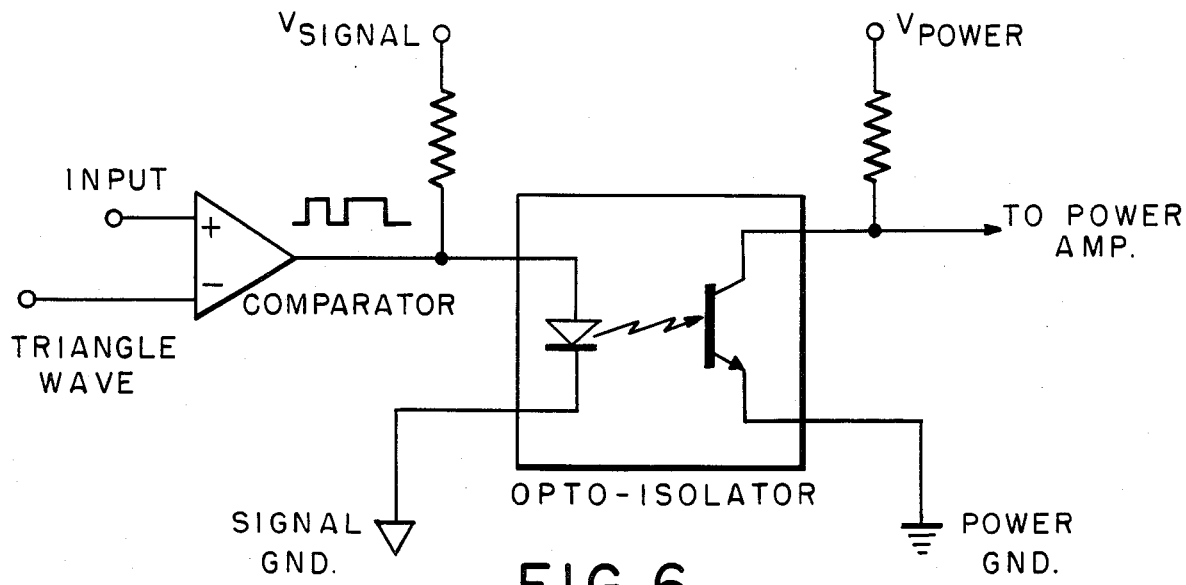
FIG. 6 is an electrical schematic diagram of a pulse-width modulator utilizing an opto-isolator.

The output of the compensation amplifier 66, 68 is preferably connected to an optically coupled pulse-width modulated driver (FIG. 6) to produce the desired fluxes and provide isolation between the low level command signals and the high current power amplifier. As current in either direction in the coil produces force in the same direction, since the force is a function of the square of the current, the amplifiers may be unipolar. The pulse width modulation results in high efficiency. The pulse width modulator is simply a comparator referenced to a triangle wave as shown in FIG. 6. The output pulse widths of the comparator are a function of the input signal level. A suitable component for the comparator would be an integrated circuit LM111 as manufactured by National Semiconductor Corp., Santa Clara, CA 95051. A suitable component for the opto-isolator would be the type 4N24, as made by Texas Instruments, Inc., Dallas TX 75265.

The operation of the system is shown most clearly in FIG. 4. A desired force $F_C$ is applied to block 50, where it is gain scaled and applied to a summing junction 54, 58. A bias voltage from source 52 is algebraically combined in junction 54 and junction 58 with scaled signal $B_{CMD}$ to provide force command signals $B_{1C}$ and $B_{2C}$, respectively. Signals $B_{1C}$ and $B_{2C}$ energize coils 74 and 76 and the flux densities produced thereby are sensed by flux sensors 77, 79. The flux density signals are combined in junctions 56 and 60 with the corresponding force command signals $B_{1C}$ and $B_{2C}$ to drive power amplifiers 70, 72 through compensation amplifiers 66, 68. The sensed flux values are thereby compared with the commanded flux density to increase or decrease the driving signal to the power amplifier, thereby producing the desired force level in linear relationship to the output force command signal.

In summary, the present invention offers the following advantages over previous linearization techniques:

(1) No requirement for sensitive, fragile, and costly force sensors.

(2) No requirement for transmitting feedback information across the magnetic gap by the use of harness assemblies or complicated non-contacting telemetry systems.

(3) No requirement for position sensors or multiplication circuitry in force linearization.

(4) The ability to use core materials exhibiting hysteresis and high saturation levels to realize smaller, lighter, and less costly actuators.

(5) High level power and low-level signal power are easily isolated using pulse width modulation techniques and optical couplers.

While the invention has been described in its preferred embodiments, it is to be understood that words which have been used are words of description rather than limitation and that changes may be made within the purview of the appended claims without departing from the true scope and spirit of the invention in its broader aspects.

We claim:
1. Apparatus for magnetic suspension comprising:
   a. an armature of ferromagnetic material moveable between predetermined limits along a first axis and freely moveable in translation along a cross-axis normal to said first axis,
   b. magnetic actuator means for applying a force on said armature along said first axis, the magnitude of said force depending on the magnitude of the magnetic flux across a gap formed between said armature and a pole piece disposed on said actuator means, said actuator means comprising a pair of half-stations disposed on opposite sides of said ar- mature along said first axis, each of said half-stations further comprising a magnetically permeably core having co-operable pole pieces, said core caring an electro-magnetic coil adapted when energized for conducting magnetic lines of flux between said cooperable pole pieces and said armature, said pole pieces spaced apart from said armature by an airgap along said first axis, said core positioned to apply magnetic force along said first axis to provide a predetermined displacement of said armature from at least one of said pole pieces, c. means for providing a force command signal representative of a desired armature force, d. means responsive to said force command signal for deriving a flux command signal representative of a desired flux density, said flux command signal coupled to supply control currents to said electromagnetic coils, e. means coupled to said core for sensing said lines of flux and deriving flux control signals representative of an actual flux density, and f. means coupled to receive said flux control signals and said flux command signals for modifying said control currents of said electromagnetic coils, so as to produce a magnetic flux density linearly corresponding to said force command signal.

2. Apparatus for magnetic suspension of an armature relative to a magnetic actuator, said actuator comprising a pair of opposing half-stations, each of said half-stations further comprised of a magnetically permeable core having cooperable pole pieces, said core carrying a pair of electromagnetic coils adapted when energized for conducting magnetic lines of flux between faces of said pole pieces and said armature, said pole pieces spaced apart from said armature by an air gap, said core positioned to apply force along an axis perpendicular to said pole pieces for displacement of said armature, relative thereto, comprising:

a. means for providing a force command signal representative of a desired armature force;

b. means responsive to said force command signal for deriving a flux command signal representative of a desired flux density, said flux command signal coupled to supply control currents to said electromagnetic coils;

c. means coupled to each said core for sensing said lines of flux and deriving flux control signals representative of an actual flux density;

d. means coupled to receive said flux control signals and said flux command signals for modifying said control currents of said electromagnetic coils, so as to produce a magnetic flux density linearly corresponding to said force command signal;

e. means for deriving a corresponding gain scaled flux density command signal representative of a desired flux density at said armature;

f. bias means for providing a predetermined flux density command signal for maintaining a predetermined bias flux in said gap;

g. means for providing algebraic sums and differences of said desired flux density command signal and said predetermined flux density signal to said means for receiving said flux control and flux command signals; and h. gain compensating means for augmenting the frequency bandwidth of said means for deriving a flux command signal, said gain compensating means having a gain characteristic proportional to the ratio:

$$\frac{K_C(S/Z_1 + 1)}{S(S/P_C + 1)}$$

where $K_C$ = the compensation amplifier gain;

$Z_1$ = a predetermined impedance characterizing a low frequency pole of a transfer function of said electromagnetic coil corresponding to the developed flux density as a function of voltage applied to the coil;

$P_C$ = is a predetermined value representative of a desired bandwidth and damping coefficient;

S = Laplace transform operator.

3. The method of driving an electromagnetic actuator of the type comprising a magnetically permeable armature suspended between pairs of cooperating electromagnetic half-stations, including the steps of:

a. applying a force command signal representative of a desired force to be applied to said armature, b. applying predetermined bias signals corresponding to a predetermined maximum force command, c. applying algebraic sums of said force command and bias signals to provide energization to said half-stations, d. sensing the flux densities of air gaps between said armature and said half-stations, e. deriving control signals from said sensed flux densities, and f. providing an algebraic sum of said derived signals and said summed force command and bias signals to modify said energization, said signals applied in ratios such that said applied force is linearly proportional to said force command signal.

4. The apparatus as set forth in claim 2, further comprising amplifier means responsive to said gain compensating means for supplying said control currents in a magnitude sufficient to provide said desired flux density.

5. The apparatus as set forth in claim 4, said amplifier means further comprising:

a. isolation means for coupling said flux command signals to said amplifier means, b. differential comparator means having a first input for receiving a reference signal waveform, and a second input for receiving said flux command signals, and providing an output pulse having a pulse-width proportional to the magnitude of said flux command signal, c. light source means coupled to receive said output pulse and to provide light pulse emissions, and d. light sensor means coupled to receive pulse emissions from said light source means and to provide a signal output proportional to said flux command signal, said signal output electrically isolated from said flux command signal.

6. The apparatus as set forth in claim 5, said bias means further comprising means for supplying bias signals of opposite senses for energizing first and second ones of said pair of half-stations.

7. The apparatus as set forth in claim 6, said flux sensor means further comprising Hall Effect Device means.

8. The apparatus as set forth in claim 2, wherein said predetermined flux density command signal is selected to provide a magnitude corresponding to a predetermined force command signal.

9. The apparatus as set forth in claim 8, wherein said predetermined flux density command signal is selected to minimize the peak power required by said actuator in accordance with the expression:

$$B_{BIAS} = \frac{(N\mu_o F_{MAX})^{\frac{1}{2}}}{2}$$

where $B_{BIAS}$ is the applied bias flux density in said gap in Teslas,

N is the number of turns comprising the coil winding of the actuator, and $F_{MAX}$ is the maximum force commanded.

* * * * *